United States Patent [19]
Williams et al.

[11] 3,988,049
[45] Oct. 26, 1976

[54] APPARATUS FOR HIGH SPEED ROTATION OF ELECTRICALLY OPERATED DEVICES

[75] Inventors: Keith E. Williams; Arnold J. Rogus, both of Valencia, Calif.

[73] Assignee: The United States of America as represented by the United States Energy Research and Development Administration, Washington, D.C.

[22] Filed: Sept. 12, 1973

[21] Appl. No.: 396,609

[52] U.S. Cl. ............................... 339/5 M; 310/71; 339/8 PB; 324/158 F
[51] Int. Cl............................................. H01r 39/34
[58] Field of Search ............ 339/5 M, 8 R, 9 R, 48, 339/49 R, 89 R, 89 M, 150 C, 150 R, 5 R, 5 P, 5 S, 8 P, 8 PB; 310/71, 231; 324/158 F

[56] References Cited
UNITED STATES PATENTS

| | | | |
|---|---|---|---|
| 1,394,901 | 10/1921 | Hobart | 339/5 S |
| 3,095,252 | 6/1963 | Adkins | 339/5 M |
| 3,185,951 | 5/1965 | Le Beau | 339/5 M |

*Primary Examiner*—Granville Y. Custer, Jr.
*Assistant Examiner*—DeWalden W. Jones

[57] ABSTRACT

Most high speed centrifuges employ a relatively small diameter elongate flexible drive shaft, sometimes called a "quill" shaft. These relatively slender shafts are flexible to absorb vibration as the assembly passes through speeds of resonance and to permit re-alignment of the axis of rotation of the shaft and the rotor driven thereby in the event the center of mass of the rotor and shaft assembly is displaced from the nominal axis of the rotation. To use such an apparatus for testing electrical devices and components, electrical conductors for wires are passed from a slip ring assembly located at an end of the quill shaft remote from the rotor and longitudinally alongside the quill shaft to the electrical device mounted on the rotor. The longitudinally extending conductors are supported against the radially outward directed centrifugal forces by a plurality of strong, self-lubricating, slightly compressible wafers or washers co-axially stacked on the slender shaft and provided with radially offset longitudinally aligned openings to support the longitudinally extending conductors. The conductors are supported against the centrifugal forces and thus protected from rupture or other damage without restricting or constraining the essential flexure or bending of the drive shaft.

11 Claims, 6 Drawing Figures

APPARATUS FOR HIGH SPEED ROTATION OF ELECTRICALLY OPERATED DEVICES

BACKGROUND OF THE INVENTION

In general the present invention relates to rotational drive assemblies equipped with electromechanical means for extending electrical signals between the relatively rotating components of the assembly.

More particularly, the present invention is directed to high speed rotational assemblies such as employed in centrifuges which are designed to drive a rotor at speeds of up to and exceeding 10,000 rpm. The most successful high speed centrifuges capable of speeds in excess of 10,000 rpm employ a relatively small diameter, elongate, flexible drive shaft sometimes referred to as a quill shaft because of its ability to flex and bend to accommodate various operating conditions.

One of the operating conditions which requires this flexibility in the drive shaft exists as the shaft and rotor driven thereby pass though "critical" speeds at which vibrational resonance takes place. At these critical speeds the rotational system enters into a mechanical resonance which creates such vibration that the drive shaft must be sufficiently resilient and flexible to absorb the vibrational energy.

Furthermore, it is many times difficult if not impossible to precisely balance the center mass of the rotor and shaft assembly such that it coincides with the nominal axis of rotation, that is the axis of rotation at the driven end of the quill shaft. This is particularly true when test objects of diverse size, shape and weight are attached to the rotor of the centrifuge. If the center mass of the rotor with the test device attached thereto and the shaft taken as a complete unit is displaced from the nominal axis of rotation, it is necessary for the drive shaft to accommodate the vibration caused by this unbalance. Moreover as the speed of the assembly passes through a critical speed at a high rpm, the rotor and shaft assembly automatically realigns itself above this critical speed so that the otherwise displaced center of mass coincides with the nominal axis of rotation. In order to provide this automatic realignment, the quill shaft must bend slightly. Typically, the shaft will assume a slight "S" shape as the center mass is realigned. Although more than one resonance speed may be exhibited by the assembly, in the embodiment disclosed herein the assembly has exhibited a relatively low level critical speed in the range of 900 rpm, and a relatively high critical speed in the neighborhood of 9,000 rpm. The above-mentioned realignment of the center of mass for the rotor and shaft unit takes place as the system exceeds the higher critical speed.

Centrifuges and other high speed rotating apparatus constructed with such a quill shaft operate very successfully. However, it is many times desirable to provide such a high speed rotational drive and at the same time conduct electrical signals between a stationary support for the drive and the rotated assembly. For example, the use of centrifuges to test electronic devices and components while under actual electrical operation requires such an arrangement.

Of course, there are several known electromechanical techinques for transmitting electrical signals between relatively moving parts. Perhaps the most common of these techniques is the use of a slip ring assembly in which transmission is provided by engagement of brushes against a relatively rotating electrically conductive ring or rings. Heretofore, however, the use of a slip ring assembly or other known electromechanical means for transmission of electrical signals through a rotational coupling has not been practical for high speed assemblies requiring the use of quill drive shafts.

Accordingly, it is a general object of the present invention to provide for the transmission of electrical signals, particularly multiple signals requiring plural conductors, between the stationary support of a quill shaft spindle assembly and the rotor driven by the quill shaft. Such an apparatus is useful for example in centrifugal testing of electrically operated devices and components, enabling the device to be subjected to high centrifugal and acceleration forces while under actual electrical operation.

Briefly, this object of the present invention is achieved by an apparatus in which one or more electrical wires or conductors are mounted so as to rotate with and extend in longitudinal adjacency to the flexible guill drive shaft. A plurality of washer or wafer-like conductor support members are coaxially stacked on the drive shaft and formed with radially offset and longitudinally aligned openings to support the conductors. These support members are formed from a material which is preferably slightly compressible, self-lubricating and sufficiently strong to withstand the pressure created by the wires in their attempt to fly radially outwardly from the shaft under the large centrifugal forces. Moreover these washer-like support members tend to slip on each other as the shaft bends so as to not constrain or stiffen the essential flexibility of the drive shaft at and above the critical speeds.

To enable these longitudinally extending wires to rotate with the shaft, electromechanical means is provided, such as a slip ring assembly rotating coaxially with the drive shaft adjacent an end thereof remote from the rotor. Adjacent this same end, a rotational drive means is provided for rotating the quill shaft. At the opposite end of the quill shaft, the longitudinally extending conductors pass from the aligned openings of the wafer-like support members to the rotor and are available thereat for connection to the electrical device under test.

It is observed that a more direct solution to the problem presented here would be to pass the longitudinally extending conductors up through a central hollow opening in the quill shaft. However, this is not practical because of the necessity of providing a quill shaft which exhibits the qualities of high tensile strength and flexibility. These requirements are most successfully and reliably provided by a solid, relatively small diameter spring steel shaft as disclosed more fully herein. A hollow shaft capable of accepting a number of conductors centrally thereof is not capable of realizing the same characteristics as the narrow, high tensile solid steel shaft used in the present invention.

These and further objects and various advantages of the apparatus according to the present invention will become apparent to those skilled in the art from a consideration of the following detailed description and appended drawings of an exemplary embodiment thereof.

BRIEF DESCRIPTION OF THE DRAWINGS

With reference to FIGS. 1 and 2 the embodiment of the invention disclosed herein includes a rotational drive apparatus 11 which may be used for any application requiring relative rotation of parts at high speeds and wherein electrical signals or power must be extended between the relatively rotating components. As above indicated, the apparatus has particular utility as the rotational drive for a high speed centrifuge adapted for testing electrically operating components, devices, and/or equipment.

Figure 1:
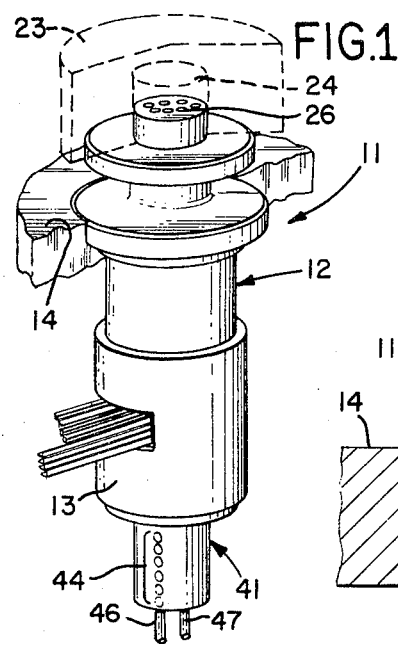
FIG. 1 is a perspective view of the apparatus in accordance with the present invention, capable of being used as the drive for a high speed centrifuge adapted for testing electrically operated devices. In this figure portions of the centrifuge and of the belt and motor drive for the apparatus have been deleted for clarity.
Figure 2:
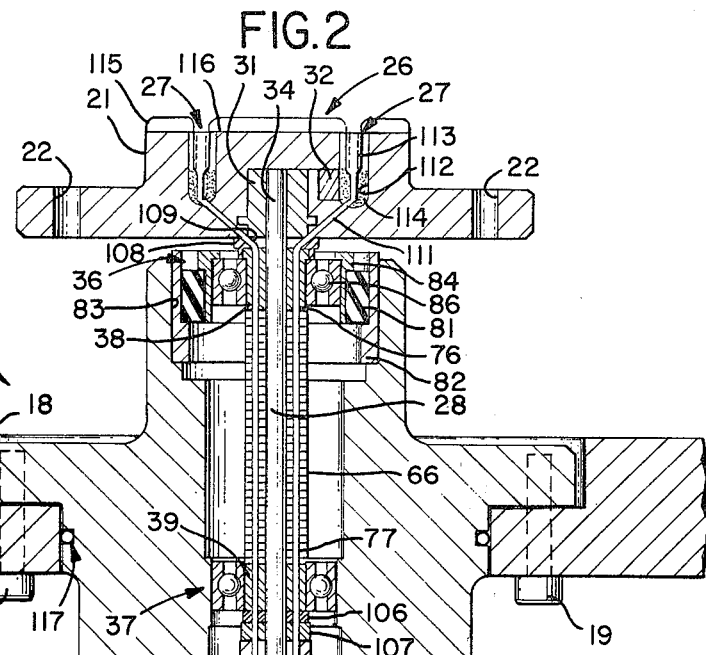
FIG. 2 is a vertical sectional view of the apparatus shown in FIG. 1.

For this purpose a drive support 12 including a lower housing portion 13 may be fixedly mounted to a supporting panel 14 such as here by means of a circular opening 16 therein having a lower circumferential flange 17 for receiving and supporting the lower surface of a mating circumferential flange 18 of drive support 12. Suitable fastening means such as the plurality of bolts 19 shown here may be used to firmly attach the rotary drive assembly to the supporting panel. As disclosed more fully herein, the present rotational drive is adapted to dispose the rotating component inside a chamber in which the pressure may be regulated. Accordingly, panel 14 is here provided by a lower or bottom wall of a sealed chamber which may be evacuated to a sub-atmospheric pressure. In this manner the port 12 and panel 14 provide the means for supporting the rotational components of the apparatus.

The electrical component or device may be mounted on a flanged drive rotor 21 and for this purpose rotor 21 may be provided with mounting holes 22 for receiving an electronic package 23 indicated by phantom lines in FIG. 1. Package 23 here includes an electrical connector 24 again shown by phantom lines for mated connection with a centrally located connector 26 here formed by a plurality of female, pen receiving socket assemblies 27 securely mounted within drive rotor 21. By virtue of this construction a rotor means is provided for receiving the electrically operated devices to be tested.

To withstand the vibrational characteristics at critical speeds and to permit realignment of the center of mass of the rotated load as explained above, apparatus 11 further concludes an elongate flexible drive shaft 28, sometimes referred to as a quill shaft mounted for rotation relative to the support 12. Shaft 28 is connected between a drive means here provided by a drive sheave and belt assembly 29, rotatably driving a lower end of shaft 28, and with the drive rotor 21 coaxially fastened to an upper end of the shaft as illustrated. A support piece 31 fixed to the shaft and a locking key 32 here serve to non-rotatably fasten drive rotor 21 to the drive shaft 28.

The quill drive shaft 28 is mounted so that it can bend and flex between a secured lower end portion 33 and its upper end portion 34 carrying drive rotor 21. The region of greatest deformation of the shaft occurs generally between an uppermost bearing assembly 36 and an intermediate bearing assembly 37, both of which rotatably support shaft 28 through metal bushings 38 and 39 respectively. To avoid the possibility of over stressing shaft 28 by limiting its freedom to flex only above bearing assembly 37, the lower segment of shaft 28, that is below assembly 37 and above the secured lower end portion 33, is free of circumferential restraints and thus may flex to accommodate relatively large bending modes in the upper section of the shaft.

As previously indicated, the conductors for extending electrical signals to and from the rotating electronics package 23 are adapted to extend longitudinally of shafts 28 and to rotate therewith. To permit relative rotation of these conductors, the electrical signals are first transmitted by electromechanical means from stationary electrical connections to electrical connections rotating with drive shaft 28. In this embodiment, the electromechanical means is provided by a multiple conductor slip ring assembly 41 in which a plurality of slip rings, for example slip rings 42 and 43 are mounted for coaxially rotation with drive shaft 28 adjacent the lower axial end portion 33 thereof. The stationary connections may be provided, as in this case, by a plurality of electrical brushes 44 adapted for electrical connection to multiple conductors for carrying electrical signals and electrical power to and from package 23. A suitable slip ring assembly for this purpose is available from the Lebow Corporation of Detroit, Mich. This particular slip ring assembly is operated with a flow of lubricating and cooling fluid circulated through inlet and outlet conduits 46 and 47 respectively. Here, a 24 conductor slip ring assembly is provided for feeding 24 electrical signals from brushes 44 up to the rotor assembly.

Each of the slip rings 42–43 is electrically extended through a multi-pin connector 51 in a known manner. From connector 51 a bundle of conductors are extended coaxially of the shaft up through a hollow cylindrical sleeve 52, through a universal coupling 53, and into an internally flared connecting member 54 where the bundle of conductors is spread radially outwardly to pass to the outside of the quill shaft 28. Member 54 has a lower sleeve portion 56, the outer circumference of which fits inside of a mated opening at the upper end of coupling 53, while the hollow interior of sleeve portion 56 carries the bundled plurality of conductors. The interior of an upper flanged portion 57 of member 54 is provided with a funnel-like, axially sloping wall portion 59 diverging away from coupling 53 to allow the bundle of wires 58 to gradually diverge and place themselves radially outwardly from the axis of shaft 28.

From here the conductors 58 are extended longitudinally upwardly of the apparatus through a shaft connection assembly 61, and upwardly from there along the interior cylindrical wall 62 of a hollow, generally cylindrical drive member 63 within which the lower section of shaft 28 is coaxially mounted.

Figure 3:
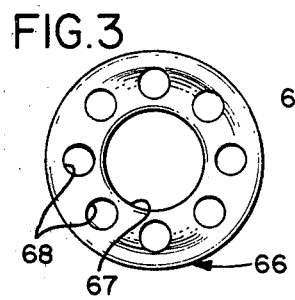
FIG. 3 is an elevation view of one of the wafer-like conductor support members which are coaxially stacked on the quill shaft of the assembly.
Figure 4:
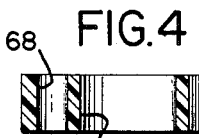
FIG. 4 is a transverse sectional view of the member shown in FIG. 3.
Figure 5:
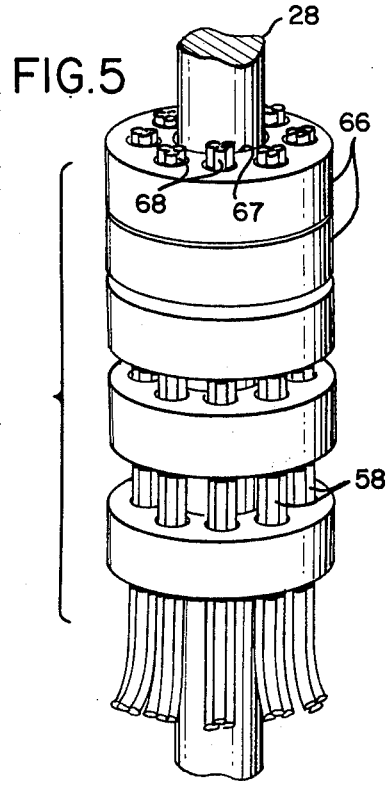
FIG. 5 is an assembly view showing the coaxial stacking of the conductor support members on the quill shaft and the arrangement of the longitudinally extending conductors held by the support members about the central shaft.

As conductors 58 pass upwardly adjacent the section of shaft 28 supported between bearing assemblies 36 and 37, a plurality of washer or wafer-like conductor support members 66 are coaxially stacked on shaft 28 to provide the necessary support for the conductors in this region without restraining the flexibility of the shaft. More particularly, members 66 are each generally shaped like a washer having a centrally located bore 67 as best shown in FIGS. 3 and 4 for forming a relatively close mating fit about the circumference of the drive shaft.

Furthermore, each member 66 is formed with at least one and preferably a plurality of radially offset openings 68 having their axes parallel to the axis of the central bore and to that of shaft 28 and being uniformly placed about the circumference of the member. Although it may be possible, if desired, to use only one such radially offset openings 68 for certain applications, it is preferable to provide a plurality of such openings such that they may be uniformly spaced about the axis of the assembly for supporting a plurality of conductors in a balanced condition about the axis of rotation. Here, each member is formed with 8 supporting openings 68 which are longitudinally aligned on shaft 28 for receiving the plurality of conductors 58. Here, three such conductors are provided in each of the eight openings.

Figure 6:
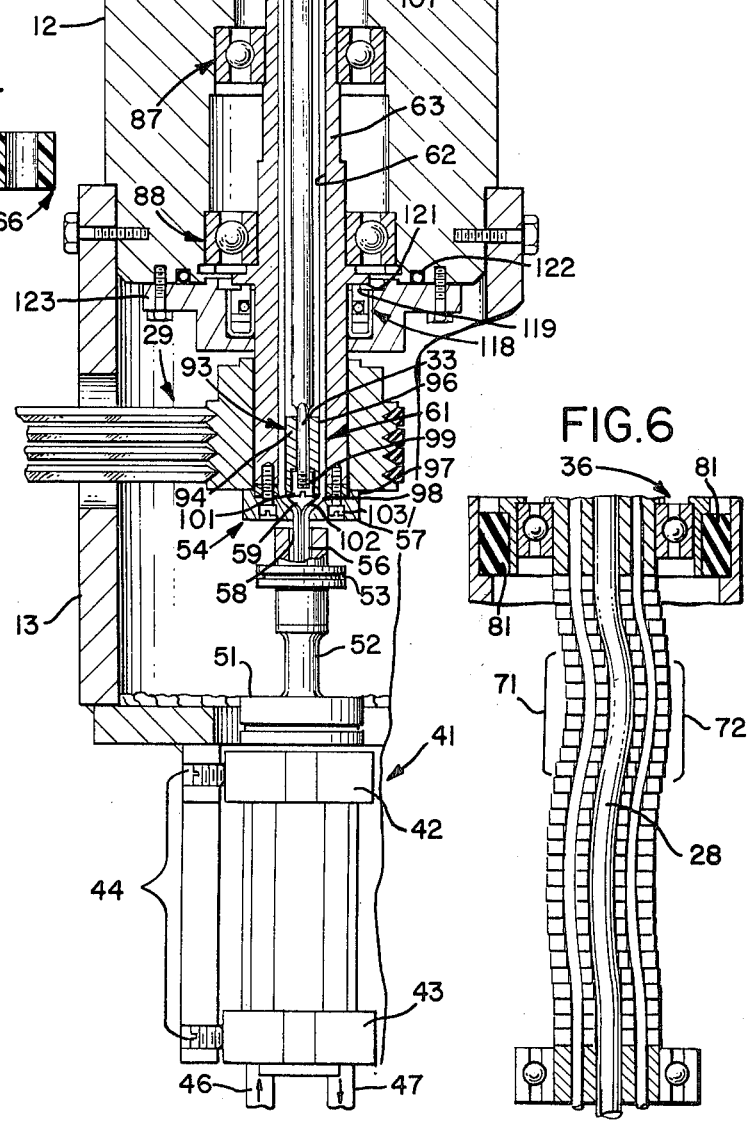
FIG. 6 is view veiw similar to FIG. 2 showing by exaggeration the bending mode of the quill shaft and the manner in which the individual conductor support members slip on one another to accommodate such bending of the shaft.

The axial dimension of each member is selected so that it is substantially less than the length of the section of shaft 28 subject to bending, such that any given one of the members 66 will not stiffen the shaft. This is best illustrated in FIG. 6 which illustrates by exaggeration the flexing of shaft 28 and the manner in which the plurality of members 66 slide relative to one another to accommodate such bending without stiffening the shaft.

Because these members must be capable of undergoing slight relative sliding in the transverse dimension, it is perferable that they be formed of a material which is self-lubircating. In the absence of a self-lubricating quality of members 66 there may be a tendency to cause over-heating of the assembly by the frictional effects between the relatively moving and engaged surfaces.

Also, preferably the material from which members 66 are made is slightly resiliently compressible, returning to its original configuration after the compressing force is removed. Again with reference to FIG. 6, during a bending mode of shaft 28, one side of the members 66 may be axially compressed, while at the same time, the diametrically opposed portions of the same members may be slightly axially fanned out, conforming respectively to the incurved and out-curved portions of the deformed shaft. The material must be capable of withstanding these compression modes which may be repeatedly applied to portions of the stack of members 66.

Further still, the large centrifugal forces to which conductors 58 are subjected requires that the material for members 66 be strong enough to retain the radial position of the wires and prevent them from flying outwardly and being ruptured during high speed rotation. A material which has been found suitable for the presently disclosed embodiment and which has all of the foregoing qualities is sold under the trademark "Rulon" and is commerically available from the Dixon Corporation of Rhode Island. During rotation at the higher speeds such as in excess of 10,000 rpm, the pressure on conductors 58 is so large that the insulation surrounding each of the wires is literally compressed under the outwardly directed force of the metal conductors such that it is easily ruptured by any abberations or sharp edges on the supporting components. Accordingly, openings 68 of each members 66, and all other supporting parts such as the inside cylindrical wall 62 of member 63 should be carefully deburred prior to assembly. For the same reason, conductors 58 should not be extended across any sharp discontinuities on the assembly, and sloping walls such as provided by portion 59 should be used to negotiate any changes in radial location of the conductors.

The stack of members 66 are axially retained between bushings 38 and 39 associated with the uppermost and intermediate bearing assemblies 36 and 37 respectively. Both of bushings 38 and 39 are provided with a plurality of radially offset openings 76 and 77 respectively, longitudinally aligned with openings 68 of members 66 for continuing the longitudinal extension of conductors 58 through the bearing assemblies 36 and 37.

To absorb the vibration of rotor 21 and shaft 28 adjacent the upper end portion 34 of the shaft as the assembly passes through resonant critical speeds, bearing assembly 36 includes a snubber means in the form of a relatively soft, resilient annular snubber member 81 which is circumferentially supported within a snubber seat 82 which in turn is mounted with a coaxial bore 83 of support 12. An annular bearing seat 84 is positioned within an interior circumference of snubber member 81 for supporting bearing 86 coaxially about shaft 28 and the metal bushing 76. Snubber member 81 may be formed of a relatively soft neoprene elastomer to afford some vibrational movement and axial misalignment of bearing 86 and thus of shaft 28 and to absorb some of the energy from the system as the rotor - shaft unit passes through the critical speed levels.

To provide a means for rotatably driving the slender flexible quill shaft 28, a generally hollow cylindrical drive member 63 is rotatably mounted on support 12 by a pair of bearing assemblies 87 and 88, coaxial with the axis of rotation of shaft 28. Sheave and belt assembly 29 are arranged adjacent a lower end of member 63 for applying the rotational drive by means of a motor (not shown). Except for the end portion 33 of shaft 28 which is anchored to member 63, the hollow interior of member 63 is of a sufficient diameter to leave a radial free space region between the exterior circumference of shaft 28 and interior wall 62 for the reasons indicated above.

Connection assembly 61 is provided by shaping the end portion 33 of shaft 28 to define a square cross section which is received in a mating, square cross section opening of a flanged, annular drive bushing 93. The body 94 of bushing 93 is generally cylindrical for insertion into the hollow bore of member 63 as shown and is provided with a plurality of longitudinally extending exterior recesses or slots 96 for accommodating the longitudinal extension of conductors 58 along the interior wall 62 of member 63. A lower portion of bushing 93 is formed with a flange 97 having passages 98 formed therethrough and communicating with recesses 96 for passing the conductors 58 upwardly from the sloping wall portions 59 of member 54. The squared end portion 33 of shaft 28 is formed with a threaded end 99 which emerges into a counter bore 101 formed in flange 97, and a mated, threaded fastener 102 threadedly locks the end of shaft 28 to bushing 93.

Bushing 93 is in turn fastened to the lower axial end of drive member 63 by means of fasteners 103 which pass through member 54 and through flanges 97 into threaded openings in member 63.

To support the various conductors 58 as they pass from the support of the interior wall 62 of member 63 into opening 77 of bushing 39, one or more additional conductor support members, such as shown by members 106 and 107 are provided. These members may be formed similar to members 66, and again the radially offset and longitudinally aligned opening should not present any sharp discontinuities or other abberations to the conductors 58 passing therethrough.

Adjacent the upper end of shaft 28, conductors 58 pass through the longitudinally aligned openings of the metal bushing 38 into a still further conductor support member 108 which is coaxially mounted on bushing 38 and is thereby restrained against any lateral or eccentric displacement. The interior annular wall 109 of member 108 is smoothly tapered or sloped so as to be outwardly divergent in a direction toward drive rotor 21. This provision, like the sloping wall portion 59 of part 54, allows the conductors 58 to be flared outwardly without any sharp discontinuity in the axial direction. The outwardly divergent conductors 58 are passed from sloping wall portion 109 of member 108 into diverging passages 111 of the drive rotor. The lower circumferential edge of rotor drive piece 31 is cut away to allow passage of the wire conductors.

Passages 111 communicate with cavities 112 formed in rotor 21, and female connector sockets 113 are mounted and secured therein by a potting compound 114 to form the socket assemblies 27. The wires of conductors 58 are at this point stripped of their insulation and securely, electrically bonded to connector sockets 113 as illustrated.

A cap 115 provided with openings in registration with connector sockets 113 may be affixed to the upper surface 116 of rotor 21 to complete the female connector 26 for receiving a mating connector 24 of electronic package 23.

As indicated above, this particular embodiment of the invention is adapted for testing the electronic devices and components within a controlled pressure or vacuum chamber. For this purpose a vacuum seal is provided between the rotating parts, support 12 and panel 14. The seal between panel 14 and support 12 may be conveniently provided by one or more O-ring assemblies such as indicated at 117.

The seal between support 12 and rotating shaft 28 and drive member 63 is provided in the following manner. The lower axial end of drive member 63 is sealed by virtue of sealed connections, starting with a hermetically sealed electrical connector 51, up through coupling 53, a sealed connection between sleeve portion 56 and coupling 53 and a sealed connection between the flange portions 57 and 97 of member 54 and bushing 93 respectively and the axial end face of drive member 63.

A seal is formed between the exterior circumference of drive member 63 and support 12 by a carbon face seal assembly 118. Such assemblies are known in the art for providing a reliable seat at a rotating coupling. In general a seal is formed between the face of an annular member 119 formed of carbon engaging a mating face 121 of a circumferential flange formed on member 63 as indicated. Also in this instance an additional O-ring seal indicated at 122 is provided for forming a seal between the carbon face seal housing 123 and support 12.

While only one particular and at this time preferred embodiment of the present invention have been disclosed herein, it will be readily apparent to persons skilled in the art that numerous changes and modifications may be made hereto without departing from the spirit of the invention. Accordingly, the foregoing disclosure and description thereof are for illustrative purposes only and do not in any way limit the invention which is defined only by the following claims.

I claim:

1. In a spindle apparatus for high speed rotation of a rotor means in which an elongate, solid, relatively slender, flexible drive shaft is connected to and for rotating said rotor means, the combination therewith of:

electromechanical means for transmitting a plurality of electrical signals from a stationary source to electrical conductors rotating with said shaft;

said electrical conductors extending longitudinally and externally of said drive shaft from said electromechanical means to and for connection to said rotor means; and a plurality of conductor support members coaxially stacked on said flexible drive shaft, said members having a plurality of conductor support openings radially offset from said shaft and being longitudinally aligned for holding and supporting said longitudinally extending conductors alongside said shaft, whereby said members provide support for said conductors against centrifugal forces occurring during high speed rotation without stiffening or otherwise restricting the flexibility of said shaft.

2. The apparatus of claim 1 wherein said conductor support members are each of a generally wafer-like configuration having a shaft receiving axial bore for stacked coaxial mounting on said shaft and said members being made of a material which is self-lubricating and resiliently compressible.

3. A spindle apparatus for high speed rotation of electrically operated devices comprising:

a support means;

a rotor means adapted to receive said electrically operated devices;

a drive means;

an elongate flexible drive shaft connected between said drive means and said rotor means and being mounted for rotation relative to said support means to permit flexing of said shaft;

electromechanical means for transmitting at least one electrical signal from at least one electrical connection at said support means to at least one electrical connection rotating with said drive shaft adjacent said drive means;

at least one electrical conductor extending longitudinally with said drive shaft from said last named electrical connection to said rotor means; and a plurality of wafer-like conductor support members each having a central bore and at least one support hole radially offset from said bore, said members being axially stacked on said flexible drive shaft with said central bores coaxial therewith and said support holes aligned with and supporting said conductor along said shaft whereby said members provide support for said conductor against centrifugal forces existing during high speed rotation of said shaft and at the same time do not restrict the essential relative flexibility of said shaft during certain rotational modes.

4. The apparatus of claim 3, wherein said conductor support members are made of a material which is self-lubricating, resiliently compressible and of sufficient strength to support the conductor or conductors against the centrifugal force to which they are subjected.

5. The apparatus of claim 3, wherein said conductor support members are formed with a plurality of said longitudinally aligned radially offset holes uniformly spaced around said central bore and a plurality of said longitudinally extending conductors are mounted in said longitudinally aligned offset holes in balanced relation to the axis of said shaft and are supported by said members thereabout.

6. The apparatus set forth in claim 3, said drive means including an elongate hollow cylindrical drive member mounted for coaxial rotation with said drive shaft, said drive shaft having a first flexure portion adjacent said rotor means and a second flexure portion adjacent said drive means, said second portion coaxially mounted within said hollow drive member and being connected therein to and for rotation with said hollow drive member, and means for rotating said drive member.

7. The apparatus of claim 6, said drive member having an interior wall which is radially outwardly spaced from the outer circumference of said drive shaft to afford relative, flexibility of said second portion of said shaft, and said conductor extends longitudinally from said offset holes in said support members into said hollow drive member and is supported therein against said centrifugal forces by said interior wall.

8. The apparatus of claim 7 wherein said conductor extends longitudinally through said hollow drive member and emerges at an axial end opening therein adjacent said drive means, said electromechanical transmission means comprising a slip ring assembly rotating coaxially with said drive shaft and drive member adjacent said drive means and connector means electrically and mechanically connecting said conductor between said slip ring assembly and said axial end opening of said drive member.

9. The apparatus of claim 8 wherein a plurality of said conductors are extended from said slip ring assembly in an axially aligned bundle and are radially outwardly divergent adjacent the end of said drive shaft to locate said conductors at a radially offset position for being longitudinally extended alongside said drive shaft, and said connector means having an internal annular axially sloping wall portion supporting said divergent conductors.

10. The apparatus of claim 6, said first portion of said drive shaft having its axial end connected to and for driving said rotor means and having said conductor support members co-axially stacked thereon, said second portion of said drive shaft having its axial end connected to said drive member to be rotatably driven by said drive means, drive member bearing means for rotatably mounting said hollow drive member and drive shaft bearing means for rotatably supporting said first portion of said drive shaft.

11. The apparatus of claim 10, said drive shaft bearing means comprising first and second bearing assemblies respectively mounted adjacent said rotor means and adjacent said hollow drive member, bushing members supporting said shaft within said first and second bearing assemblies, said bushing members having radially offset axially extending support holes aligned with said support holes of said conductor support members for receiving, passing, and supporting said conductors in their longitudinally extending positions through said first and second bearing assemblies, and said conductor support members being mounted between said first and second bearing assemblies and being axially retained by said bushing members.

* * * * *